3,484,315
REACTION PRODUCTS OF ALANE TERMINATED BERYLLIUM HYDRIDE WITH $B_2H_6$, $Be(BH_4)_2$ OR $B_4H_{10}$
Ross I. Wagner, 4943 Queen Victoria Road, Woodland Hills, Calif. 91364; Louis R. Grant, Jr., 2278 Ronda Vista Drive, Los Angeles, Calif. 90027; and Frank C. Gunderloy, Jr., 3176 N. Divernon Ave., Santa Susana, Calif. 93063
No Drawing. Filed Dec. 7, 1967, Ser. No. 690,705
Int. Cl. C06b *15/10;* C07f *5/02;* C06d *5/08*
U.S. Cl. 149—22      3 Claims

ABSTRACT OF THE DISCLOSURE

Mobile liquid borane terminated beryllium hydride compounds are produced by reacting alane terminated beryllium hydride liquids with a compound selected from the group consisting of $B_2H_6$, $Be(BH_4)_2$, and $B_4H_{10}$. These compounds are useful as rocket fuels and can be burned with $H_2O_2$.

Cross-references to related applications

This invention is related to co-pending application Ser. No. 607,132 filed Dec. 28, 1966, in the names of E. F. C. Cain et al., having a common assignee.

Background of the invention

It is well known that beryllium is of great interest as a propellant fuel component since it is an extremely energetic element and serves to increase the performance of the fuels. Usually, the beryllium is combined with hydrogen in the form of beryllium hydride. The beryllium compounds can be incorporated into solid propellant formulations or used in liquid propellant applications.

Prior art

Co-pending application Ser. No. 607,132, with a common inventor and assignee, discloses the reaction of di-methyl- or trimethyl-alane and $BeH_2$ to produce a stable non-volatile mobile liquid beryllium hydride compound which is terminated by aluminum alkyl (alane) groups. The specific alane terminated beryllium hydride (ATBH) liquid achieved from this reaction is a function of temperature, reaction time, the ratio of reactants, and starting alane. Generally, the reaction takes place between about 110° C. and 200° C. The reaction of $BeH_2$ with the aluminum compound should take place between about 2 and 100 hours. The reactants should be present in molar ratios of $BeH_2$ to aluminum compound of from 0.1 to 100. Ratios of about 2 to 10 are preferred. The reaction must be performed either in a vacuum or in an inert gas blanket.

As revealed in the referenced application, ATBH liquids do have superior properties when used as liquid rocket fuels. However, these properties could be improved upon if the ATBH liquids were to be converted to boron alkyl (borane) terminated beryllium hydride (BTBH) liquids. The improvement in impulse is attributable to the lower molecular weight of boron and its combustion products.

It is an object of this invention to provide new borane terminated beryllium hydride derivatives, and a method for their preparation.

It is a further object of this invention to provide new liquid fuel compositions, and methods for their preparation.

Other and more specific advantages of this invention will become apparent from the following description.

The objects of this invention are accomplished by reacting alane terminated beryllium hydride liquids with a compound selected from the group consisting of $B_2H_6$, $Be(BH_4)_2$ and $B_4H_{10}$. In general, the reaction of the boron compound with the alane liquid should take place above about —80° C. and below about +100° C. Ambient temperature is preferred. The reaction should take place for between about 10 minutes and about 48 hours. The reactants should be present in molar ratios of boron compound to alane terminated beryllium hydride liquid of about 0.1:1 to 10:1. Ratios of about 0.5:1 to 3:1 are preferred.

It should be noted that another common boron hydride, pentaborane-9, will not work in the process of the instant invention. It is hypothesized that this is due to the relative difficulty of forming the highly reactive moiety $BH_3$ by cleaving the $B_5H_9$ molecule, while this moiety is relatively easily formed by cleavage of $B_2H_6$, $Be(BH_4)_2$ and $B_4H_{10}$.

At least 80 percent of the aluminum in the ATBH liquids is replaced in this process by boron to form the new BTBH liquids. This provess may be generalized by the equation:

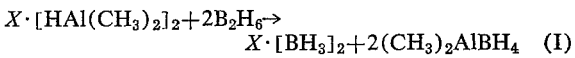

$$X \cdot [HAl(CH_3)_2]_2 + 2B_2H_6 \rightarrow X \cdot [BH_3]_2 + 2(CH_3)_2AlBH_4 \quad (I)$$

where X represents the beryllium-containing portion of the ATBH or BTBH liquid. In this general example, it may be seen that the $HAl(CH_3)_2$ (an alane terminator) is replaced by $BH_3$ (a borane terminator) while $CH_3$ groups and aluminum are displaced as the volatile compound $(CH_3)_2AlBH_4$.

This incorporation of boron and hydrogen in place of aluminum and $CH_3$ groups is highly advantageous to a rocket fuel, since it is known that the highest specific impulses are obtained when combusting fuels of the highest possible hydrogen contents combined with elements of the lowest possible atomic weight, such other elements being capable of high heat release during combustion. In the instant invention, it would be preferred to combust the BTBH liquids with an oxygen oxidizer such as $H_2O_2$, in order to obtain high heat release by virtue of forming beryllium and boron oxides.

An example of a preparation of the starting alane terminated beryllium hydride liquid of the instant invention would be as follows:

Example I

A mixture of $Al(CH_3)_3$ (104 mmoles) and $BeH_2$ (45.4 mmoles) was heated at 120° C. for 16 hours. The filtered solution was used as the standard ATBH liquid for the hydriding reactions. An aliquot (2 milliliters) of the filtrate was taken and the excess $Al(CH_3)_3$ was removed until constant weight (0.120±0.002 gram) was achieved. Analysis of the viscous residue gave the Al:Be:H:$CH_3$ ratio of 0.24:1.0:1.0:1.85 from which data the approximate empirical formula $(CH_3BeH)_8 \cdot 4[Al(CH_3)_3]_2$ can be calculated. Therefore, 0.120 gram of this ATBH liquid is approximately one-third of a mole.

Using this alane terminated beryllium hydride liquid and diborane, a mobile liquid borane terminated beryllium liquid was synthesized according to the following example:

Example II

A 2-milliliter aliquot of the standard ATBH material was pumped to constant weight (0.1185 gram) and subsequently treated with $B_2H_6$ (0.455 mmole) at ambient temperature. The mixture became quite mobile within a few minutes after reaching ambient temperatures. The volatile components (0.0588 gram) were fractionated to obtain $B(CH_3)_3$ (0.06 mmole) and an aluminum-containing liquid. Analysis of the non-volatile viscous material revealed the Be:H:$CH_3$ ratio of 1:1.5:0.93. The amount of aluminum (14.9 milligrams) found in the volatile fraction corresponded to a 80 percent displacement.

Once again using the alane terminated beryllium hydride liquid whose synthesis was described in Example I, a borane terminated beryllium hydride liquid was made with beryllium borohydride according to the following example:

Example III

A sample (0.1204 gram) of the ATBH material, as obtained above for the previous reaction, was treated with $Be(BH_4)_2$ (0.0175 gram, 0.452 mmole) at ambient temperature. The viscous ATBH material became quite mobile and contained only a small quantity of solid after 1 hour; all but a trace of this material dissolved after stirring overnight. Fractional condensation yielded an aluminum-containing compound but no alkyl-boron derivatives. Analyses of the non-volatile viscous material revealed the $Be:H:CH_3$ ratio of $1:1.8:0.92$, while the volatile fraction contained 82 percent of the aluminum.

Again, using the alane terminated beryllium hydride liquid of the Example I, this time using tetraborane as the other reactant produced a borane terminated hydride liquid according to the following synthesis.

Example IV

A third sample (0.1213 gram) of the prepared ATBH liquid was treated with $B_4H_{10}$ (0.429 mmole) at ambient temperature. The liquid required approximately 1 hour to become mobile. After stirring the mixture for 16 hours, the liquid products were separated into volatile and non-volatile fractions which were subsequently analyzed. The volatile portion contained approximately 85 percent of the aluminum while the non-volatile liquid material had $Be:C:CH_3$ ratio of $1.0:2.9:1.0$.

Example V

In substantially the same synthesis as Example II, 0.120 gram of ATBH liquid is treated with .0833 mmole of $B_2H_6$. A mobile BTBH liquid is obtained.

Example VI

In substantially the same synthesis as Example IV, 0.120 gram of ATBH liquid is treated with 1 mmole of $Be(BH_4)_2$. A mobile BTBH liquid is obtained.

Example VII

In substantially the same synthesis as Example III, 0.120 gram of ATBH liquid is treated with 3 mmoles of $Be(BH_4)_2$. A mobile BTBH liquid is obtained.

It can be seen that all of the borane terminated beryllium hydride liquids have a lower $CH_3$ group content and a higher hydrogen content than the alane terminated beryllium hydride liquid from which they were derived.

Since it is obvious that many changes and modifications can be made in the above described details without departing from the nature and spirit of the invention, it is to be understood that the invention is not to be limited thereto except as set forth in the appended claims.

We claim:
1. The product produced from the process of reacting an alane terminated beryllium hydride liquid with a compound selected from the group consisting of $B_2H_6$, $Be(BH_4)_2$ and $B_4H_{10}$, thereby producing a mobile borane terminated beryllium hydride liquid.

2. The product of claim 1 in which the boron compound to alane terminated beryllium hydride liquid molar ratio is between about 0.1:1 and about 10:1.

3. The product of claim 2 in which the ratio is between about 0.5:1 and about 3:1.

References Cited

UNITED STATES PATENTS

| 2,826,598 | 3/1958 | Ziegler | 260—448 |
| 3,062,856 | 11/1962 | D'Alelio | 260—448 |

LELAND A. SEBASTIAN, Primary Examiner

U.S. Cl. XR.

60—215; 260—448, 606.5

PO-1050
(5/69)

UNITED STATES PATENT OFFICE
CERTIFICATE OF CORRECTION

Patent No. 3,484,315              Dated December 16, 1969

Inventor(s) Ross I. Wagner, Louis R. Grant, Jr., and Frank C. Gunderloy, Jr

It is certified that error appears in the above-identified patent and that said Letters Patent are hereby corrected as shown below:

Column 1, line 9, after "93063", add --- assignors to North American Rockwell Corporation ---.

SIGNED AND
SEALED
NOV 3 1970

(SEAL)
Attest:

Edward M. Fletcher, Jr.
Attesting Officer

WILLIAM E. SCHUYLER, JR.
Commissioner of Patents